US009373221B2

(12) United States Patent
Schroetter

(10) Patent No.: US 9,373,221 B2

(45) Date of Patent: Jun. 21, 2016

(54) METHOD AND SYSTEM FOR PAYING OUT CREDIT BY MEANS OF GAME MACHINES

(75) Inventor: Florian Schroetter, Schoenfeld (AT)

(73) Assignee: Novomatic AG, Gumpoldskirchen (AT)

( * ) Notice: Subject to any disclaimer, the term of this patent is extended or adjusted under 35 U.S.C. 154(b) by 81 days.

(21) Appl. No.: 13/979,689

(22) PCT Filed: Jan. 11, 2012

(86) PCT No.: PCT/AT2012/000006
§ 371 (c)(1),
(2), (4) Date: Aug. 7, 2013

(87) PCT Pub. No.: WO2012/094688
PCT Pub. Date: Jul. 19, 2012

(65) Prior Publication Data

US 2013/0310162 A1 Nov. 21, 2013

(30) Foreign Application Priority Data

Jan. 13, 2011 (EP) .................................... 11450001

(51) Int. Cl.
*G09C 1/00* (2006.01)
*G07F 17/32* (2006.01)
*G07F 17/34* (2006.01)

(52) U.S. Cl.
CPC ........ *G07F 17/3244* (2013.01); *G07F 17/3251* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 5,854,477 | A | 12/1998 | Kawaji et al. | |
| 6,852,029 | B2 | 2/2005 | Baltz et al. | |
| 2003/0064800 | A1 * | 4/2003 | Jackson et al. | 463/30 |
| 2005/0137016 | A1 * | 6/2005 | Enzminger et al. | 463/42 |
| 2006/0049624 | A1 * | 3/2006 | Brosnan et al. | 283/17 |
| 2006/0049634 | A1 | 3/2006 | Goodsel et al. | |
| 2008/0135608 | A1 * | 6/2008 | Ireland et al. | 232/1 D |
| 2009/0131155 | A1 | 5/2009 | Hollibaugh et al. | |
| 2009/0156303 | A1 * | 6/2009 | Kiely et al. | 463/29 |
| 2011/0275438 | A9 * | 11/2011 | Hardy et al. | 463/42 |

FOREIGN PATENT DOCUMENTS

| | | | |
|---|---|---|---|
| JP | 2000154345 | A | 6/2000 |
| WO | 03028826 | A1 | 4/2003 |
| WO | 2009064695 | A1 | 5/2009 |

* cited by examiner

*Primary Examiner* — Jason Yen

(74) *Attorney, Agent, or Firm* — Laurence A. Greenberg; Werner E. Stemer; Ralph E. Locher

(57) ABSTRACT

A method pays out credit via a system having a server and a number of game machines connected to the server and operated by a player. A game machine has a game unit and a payout unit that can be activated by a player for paying out a credit via a confirmation ticket or a data storage medium. When a credit is present, the game unit allows a game to be played, and when a credit is present and the payout unit is activated, a data set is transmitted to the server, the data set contains the amount of the credit. The data set is stored upon being deposited in the server, and a release data set is transmitted back to the game machine if the data set is stored. A confirmation ticket is provided when the release data set is deposited at the respective game machine, and the confirmation ticket is dispensed to the player.

20 Claims, 5 Drawing Sheets

| Machine | Credit | Win | Time | Date | Player-ID | Code | Release key | Info |
|---|---|---|---|---|---|---|---|---|
| 1 | 274 | -30 | 00:17 | 1.1. | 1 | XXUZ | ACXP9 | - |
| 7 | 1100 | -200 | 19:30 | 5.1. | 2 | PTF2 | 3ZYFX | - |
| 9 | 7 | -301 | 19:12 | 5.1. | 1 | LK3V | 4FXXT | Voucher |
| 14 | 0 | -47 | 20:30 | 6.1. | 3 | 6DYR | 9LWP2 | - |
| 2 | 203 | +3 | 21:00 | 6.1. | 4 | M9CC | ZZ170 | Voucher |
| 2 | 30 | -190 | 21:17 | 6.1. | 5 | 7GHE | O4OZP | - |
| 4 | 0 | -14 | 21:04 | 10.1. | 1 | ADWQ | ELP3A | - |
| 1 | 56 | +254 | 22:30 | 11.1. | 2 | 65RT | XYTF1 | Voucher |

101 102 103 104 105 106 107 111 112

| Machine | Credit | Win | Time | Date | Player-ID | Code | Release key | Info |
|---|---|---|---|---|---|---|---|---|
| 1 | 274 | -30 | 00:17 | 1.1. | 1 | XXUZ | ACXP9 | - |
| 7 | 1100 | -200 | 19:30 | 5.1. | 2 | PTF2 | 3ZYFX | - |
| 9 | 7 | -301 | 19:12 | 5.1. | 1 | LK3V | 4FXXT | Voucher |
| 14 | 0 | -47 | 20:30 | 6.1. | 3 | 6DYR | 9LWP2 | - |
| 2 | 203 | +3 | 21:00 | 6.1. | 4 | M9CC | ZZ170 | Voucher |
| 2 | 30 | -190 | 21:17 | 6.1. | 5 | 7GHE | O4OZP | - |
| 4 | 0 | -14 | 21:04 | 10.1. | 1 | ADWQ | ELP3A | - |
| 1 | 56 | +254 | 22:30 | 11.1. | 2 | 65RT | XYTF1 | Voucher |

41 42

METHOD AND SYSTEM FOR PAYING OUT CREDIT BY MEANS OF GAME MACHINES

BACKGROUND OF THE INVENTION

Field of the Invention

The invention relates to a procedure and a system for the pay-out of credit by means of automatic gaming machines.

The invention refers to a procedure as well as a system for the pay-out of credit. Such procedures and systems are advantageously applied in the area of automatic gaming, such as in casinos or in amusement arcades.

In the present state of technology many different procedures and systems are known for the execution of cashless gaming transactions in the case of automatic gaming machines. In particular automatic gaming machines are known which are operated with a specific credit paid by the player in advance. Thereby a specific credit is specified for the automatic gaming machine, which can be paid directly into the automatic machine in coins or notes, but also by inserting or introducing a ticket in the automatic gaming machine or also by introducing a chip card in the automatic gaming machine. Tickets or chip cards can, for example, be issued by an employee of the casino or by the automatic machine after paying a specific amount of credit. On both the chip card as well as on the ticket a specific amount of money for the automatic gaming machine is stored in readable form.

Alternatively the amount of money can also be stored in a central server which is connected to the individual automatic gaming machines, wherein the ticket only shows a code which refers to a memory space on the server where the respective amount of money is stored.

With the above-mentioned procedure of networking of automatic gaming machines there is also the possibility that the player receives a ticket or his chip card from the automatic machine wherein either directly on the ticket or on the chip card or on a central server the respective credit of the player is stored.

If the player wants to terminate the game although he still has credit available, he can effectuate the pay-out of his credit by the actuation of a pay-out unit. The pay-out occurs either through an immediate cash pay-out, by the issuing of a new ticket with a newly printed out credit amount, or by storage on the chip card.

On the other hand in order to be able to access the credit the player can insert the ticket or the stored chip card into the same automatic gaming machine or into any other automatic machine and start another game.

If networks are used the respective ticket only contains a code, for example a reference to a memory space in the server where the respective amount of money is stored. When the ticket is read by the automatic gaming machine, the automatic gaming machine transfers the code to the server and receives the respective amount of money from the server.

Such a procedure allows for a fast transfer of larger amounts of money without the player having to carry money himself, if applicable, also motivating the player to place higher stakes. Furthermore it can be thereby avoided that each individual player has to carry a large amount of change, unless rounded stakes or winnings or credit are paid or paid back. Furthermore, this advantageous procedure also means that the installation of coin output devices on each single automatic gaming machine can be avoided.

There is however the considerable disadvantage with conventional automatic gaming machines that the tickets read are kept in the automatic gaming machine itself. In order to avoid the automatic machine from overfilling the collected original tickets are removed from the automatic gaming machine from time to time.

The task is therefore to simplify the maintenance of the individual automatic machines, in particular to avoid a regular emptying of the container with the original tickets read of the automatic machines and at the same time undertake a recording of the achieved scores, which is difficult to manipulate.

BRIEF SUMMARY OF THE INVENTION

The invention foresees a procedure for the pay-out of credit by means of a system comprising a server and a number of automatic gaming machines connected to the server and operable by a player, wherein at least one automatic gaming machine features one game unit and one pay-out unit operable by a player for the pay-out of credit. It is thereby foreseen that

- the game unit allows the execution of a game with the presence of credit,
- with presence of credit and operation of the pay-out unit a dataset is transferred to the server comprising the amount of credit,
- the dataset upon its receipt to the server is stored and in the event of a successful storage a release dataset is returned to the automatic gaming machine,
- upon receipt of the release dataset at the respective automatic gaming machine a confirmation ticket is made available and dispensed to the player,
- wherein the dataset will be kept available for the print-out by the server.

With these advantageous features the maintenance of the automatic gaming machine is considerably simplified. In particular the time and cost consuming scanning of the tickets in the automatic machines can be eliminated completely.

A further advantage is that, for example, in the case of a mistake when reading the tickets into the automatic gaming machine a comparatively simple traceability and ascertainment of the amount to be paid for the player is possible.

For the avoidance of waste paper in the automatic machines it can further be foreseen that for the confirmation of a credit a preferentially reprintable confirmation ticket showing at least information about the credit before the execution of a game is read and subsequently at least information about the credit on the confirmation ticket is deleted or removed and a new imprint corresponding, if applicable, to the dataset and/or the release dataset is printed on the confirmation ticket.

For the advantageous storage of the tickets in printed and/or electronic form it can be foreseen that the dataset is printed on a printer connected to the server and/or that the dataset is included in an electronic permanent document stored in the server, which is kept available for print-out.

For the increase of security of the automatic gaming machines and the reduction of the possibilities of manipulation by the player it can be foreseen that the dataset in the period between the receipt of the dataset to the server and the transmission of the release dataset at the automatic gaming machine is printed out and/or is included at the end of the electronic document.

For the simplification of the machine readability of the printed out or stored receipts it can be foreseen that the dataset is at least partially printed out on the printer in the form of a barcode or included in the electronic document.

For the improvement of the allocation between individual players, winnings and credit as well as recording the gaming behaviour of individual players it can be foreseen that the release dataset or the confirmation ticket, in particular in the form of a barcode, is printed by the automatic gaming machine and/or that the release dataset or the confirmation ticket is stored on a storage medium, in particular a chip card, in data link with the automatic gaming machine and allocated to the automatic gaming machine.

Furthermore it can be foreseen that for the confirmation of a credit, preferentially a reprintable confirmation ticket is read prior to the start of game and after the end of the game the confirmation ticket is deleted or destroyed and a new imprint corresponding, if applicable, to either the dataset and/or the release dataset is printed on the confirmation ticket.

Hereby the number of the tickets in circulation can be reduced enormously. In particular no tickets are in circulation or available in the automatic gaming machines that no longer have validity. Hereby on the one hand the emptying of the automatic machines is rendered superfluous, on the other hand there are no tickets in circulation that have become invalid, which reduces substantially the danger of fraud.

In order to achieve a safe destruction of confirmation tickets it can be foreseen that for the confirmation of a credit a preferentially reprintable confirmation ticket is read prior to the start of the game and after the end of the game the confirmation ticket is destroyed and stored in the respective automatic gaming machine, and, if applicable, compressed and a new confirmation ticket is issued on which, if applicable, a new imprint corresponding to the dataset and/or release dataset is printed.

For the reduction of possibilities of manipulation it can be foreseen that

- the dataset received by the server and the release dataset generated following the receipt of the dataset are stored in the server in a manner relatable to another and/or
- further information, such as a respective identifying information of the automatic gaming machine transferring the dataset and/or the time and/or the date of pay-out of the credit, is added on the dataset.

In order to avoid multiple pay-outs it can be foreseen that after the storage of the dataset in the server or after the printing out of the dataset by the server or after issuing the confirmation ticket by the automatic gaming machine the credit is deleted and the automatic gaming machine is, if applicable, prepared for the execution of a new game.

Furthermore the invention relates to a system for the pay-out and confirmation of credit comprising a server and a number of automatic gaming machines connected to the server and operable by a player,

- wherein at least one automatic gaming machine features a game unit and a pay-out unit for the confirmation of a credit in the form of confirmation tickets; and
- wherein the game unit facilitates the execution of a game with the presence of credit; and
- wherein the automatic gaming machine features a machine-side sender unit for the release of a dataset containing the credit to the server in the event of actuation of the pay-out unit by the player during the simultaneous presence of a credit, and
- wherein the server features a server-side receiver unit for the receipt of the dataset as well as a database for the filing of the dataset, and
- wherein the server features an examination unit downstream of the server-side receiver unit, which examines the storage of the dataset, and
- wherein the server features a server-side sender unit which in the event of a successful examination of the storage of the dataset by the examination unit sends a release dataset to the automatic gaming machine, and
- wherein the automatic gaming machine features a machine-side receiver unit for the receipt of the release dataset and an output unit, wherein with the receipt of the release dataset in the respective automatic gaming machine via the output unit a confirmation ticket is available and dispensable to the player, and
- wherein the server contains a print storage, which has the dataset available for printout.

Hereby it can be particularly foreseen that the automatic gaming machine features a reading device for the reading of tickets or of chip cards, wherein, if applicable, the reading device and the output unit are integrated in a common device, and wherein the common device is designed either for the deletion and the renewed writing or the removal of the imprint and the subsequent renewed imprinting of the confirmation ticket.

Furthermore it can be foreseen that the server is connected with a printer, wherein the server features a print control unit, which after receipt of the dataset initiates the print-out of the respective dataset by the printer.

This facilitates a simple archiving of the printed out pay-out confirmations.

Furthermore it can be foreseen that the pay-out unit features a ticket printer for the print-out of the release dataset or the confirmation ticket on a ticket carrier body, for example paper, or a chip card writing device for the storage of the release dataset or the confirmation ticket on a chip card and/or that the automatic gaming machine features a reading device for the reading of tickets or chip cards.

Hereby the reading or the issuing of tickets to the individual player is facilitated in an advantageous manner.

Advantageously the reading device and the output unit are integrated in a common device. This simplifies the operability.

This common device is designed in a preferred embodiment of the invention for the deletion and renewed rewriting of the confirmation ticket. Hereby the number of the tickets in circulation can be reduced enormously. In particular no tickets are in circulation or available in the automatic gaming machines that are no longer valid. Hereby on the one hand the emptying of the automatic machines is rendered superfluous, on the other hand there are no tickets in circulation that have become invalid, which reduces substantially the danger of fraud.

In order to achieve a simple structure of an automatic gaming machine and to achieve a safe destruction of confirmation tickets it can be foreseen that the automatic gaming machine features both a reading device and an output unit, wherein the output unit features a ticket printer for the print-out of the confirmation ticket on a ticket carrier body, for example paper, and wherein the reading device features a reading unit for the reading of the dataset stored on the confirmation ticket and the reading device features a destruction unit, in particular in the manner of a document shredder for the destruction of the confirmation tickets and, if applicable, a collection container for the collection of the destroyed confirmation tickets.

For the improved traceability of winnings and credit transfers as well as the traceability of activities of individual players it can be foreseen that a database for the saving of the received datasets, wherein each dataset is allocated to a credit, if applicable, also to other information such as an identification number of the automatic gaming machine, the time of the winnings and the date of the winnings.

For the increase of safety against manipulation of the system it can be foreseen that an encoding unit is upstream of the server-side or machine-side sender unit, which encodes the release dataset or the received dataset in accordance with specified criteria and the established encoded value is made available to the server-side or machine-side sender unit, wherein the encoded value is contained in the dataset or in the release dataset.

Advantageously it is hereby foreseen that a decoding unit is downstream of the machine-side or server-side receiver unit for the decoding of the release dataset or the dataset.

In addition for further increase of the safety of the system as well as the improved traceability of the gaming behaviour of individual players it can be foreseen that a further dataset is foreseen, in which the release datasets are stored, wherein an allocation between each dataset and the respective release dataset generated following the receipt of this dataset is stored, and/or that respectively a dataset and the release dataset generated following the receipt of this dataset are combined in one common dataset and stored in the database.

DESCRIPTION OF THE INVENTION

In the following the invention will be presented based on a preferred embodiment without limitation to the general inventive idea.

Figure 1:
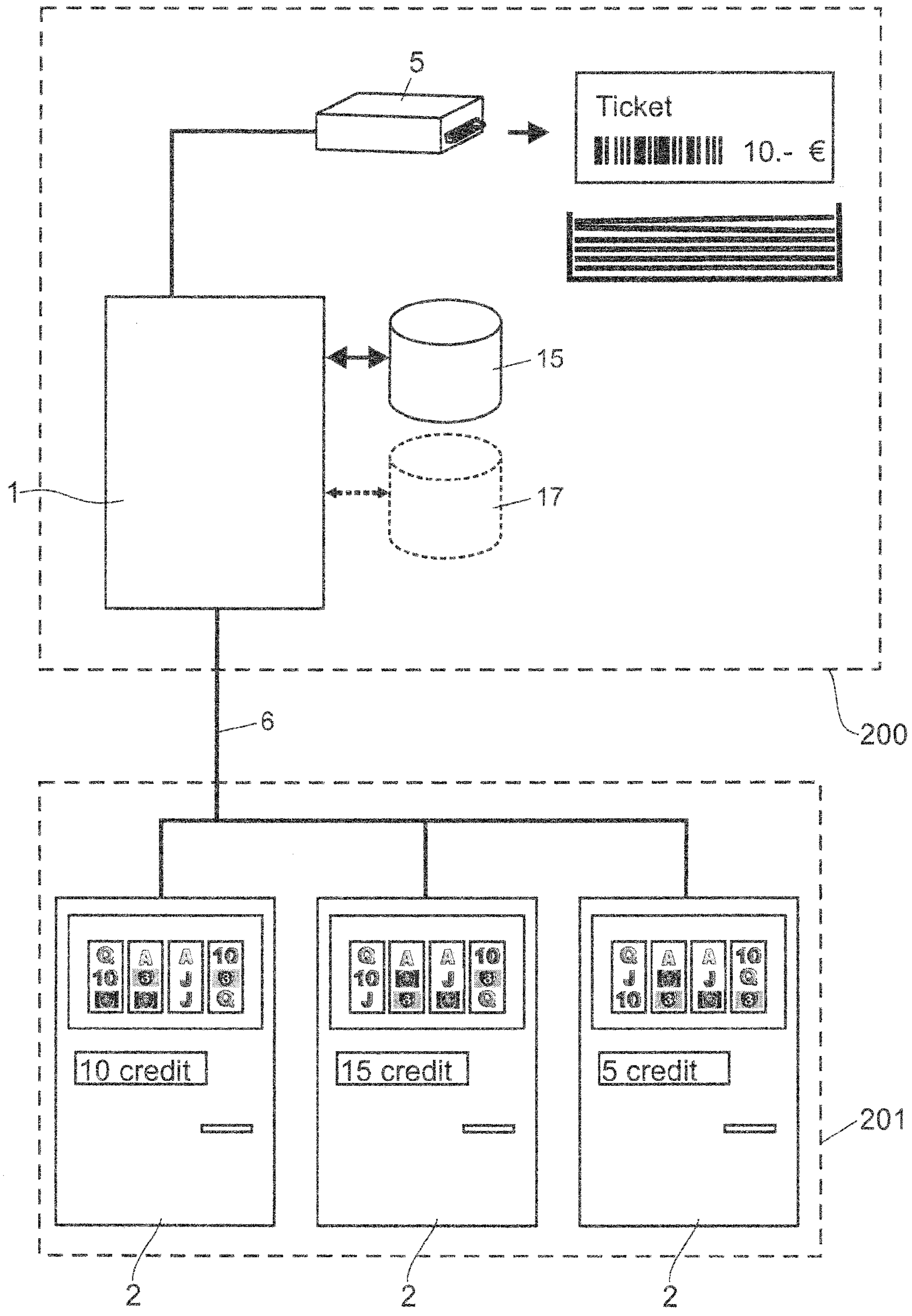
FIG. 1 shows a schematic embodiment of the system according to invention.

A preferred embodiment illustrated in FIG. 1 of a system according to invention contains a server 1 as well as a number of automatic gaming machines 2 connected thereto. The automatic gaming machines 2 are connected with the server 1 by means of a network 6 and the respective interfaces 27, 28. The network 6, the server 1 and the automatic gaming machines 2 are dimensioned in such a manner that the server 1 can even then process received datasets when all the automatic gaming machines 2 transfer datasets to the server simultaneously. Regarding network 6 there can be either a wired or wireless network.

In principle the communication between the server 1 and the one of the automatic gaming machines 2 respectively occurs always in the same manner. The server 1 is thereby designed in such a manner that it can interact with all of the automatic gaming machines 2 almost simultaneously and can record the pay-out of the individual automatic gaming machines 2 simultaneously.

A credit can be entered in different ways in the automatic gaming machines 2. Either the money can be inserted directly into the automatic gaming machine or chip cards or confirmation tickets can be introduced into a reader unit 25.

FIG. 1 shows a server 1 which is connected via a data link 6 with various automatic gaming machines. Apart from these illustrated automatic gaming machines 2 a number of further automatic gaming machines, which are not illustrated, can be connected via the network 6. A typical automatic gaming machine is illustrated in FIG. 2.

Figure 2:
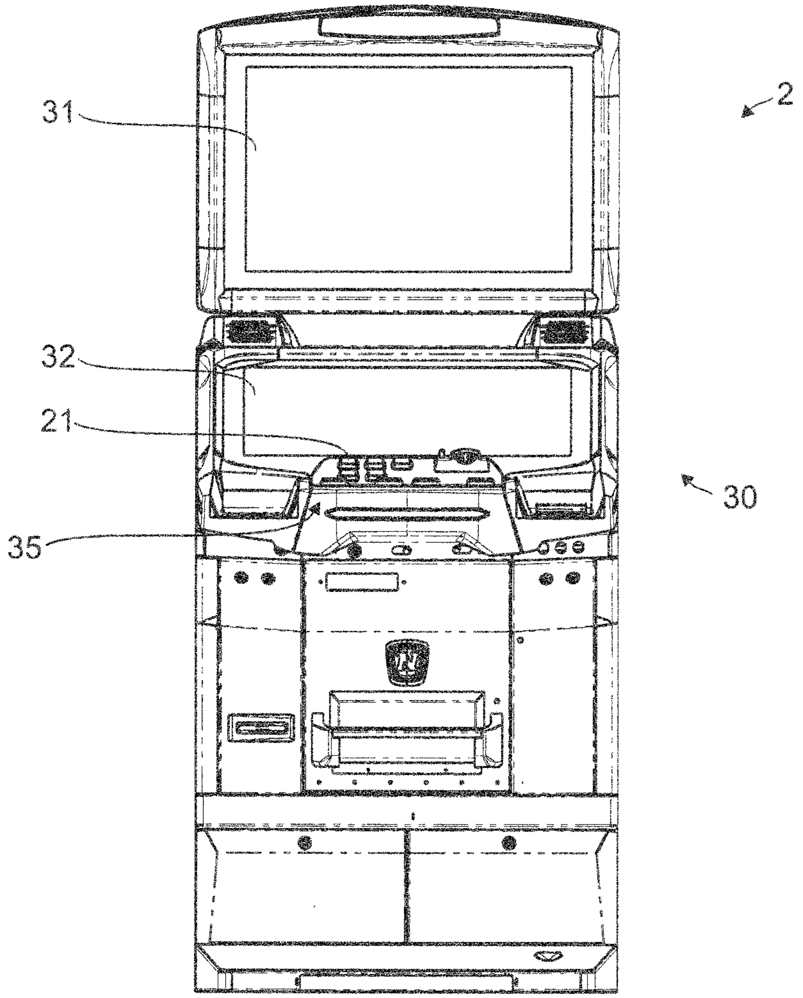
FIG. 2 shows the front view of the automatic gaming machine.

The automatic gaming machine 2 depicted in FIG. 2 forms a stationary unit in the shape of a stand-alone device and comprises an approximately head-high, broadly-speaking box-shaped house, of which the upper part serves for the inclusion of a display unit 30, that consists in the illustrated embodiment of two extensive visual display units 31 and 32 arranged on top of each other. As shown in FIG. 2 the two visual display units 31 and 32 are inclined at an obtuse angle to each other, wherein the upper visual display unit 31 extends substantially vertically, while the lower visual display unit 32 is arranged in a gradient manner inclined towards the player. Below the visual display units 31 and 32 the housing of the automatic gaming machine 2 features a control panel section protruding towards the player that extends across the entire width of the device housing and is designed substantially in a box-shaped manner. In the illustrated embodiment the mentioned control panel unit connects continuously inclined in approximately the same direction to the housing section, that includes the lower visual display unit 32.

The upper side of the control panel section houses the control panel 35 that contains various operating buttons 35 to be actuated by hand, for example in the form of press keys. Hereby mechanic switches or control panels of a touch screen or also other operational elements can be foreseen.

The games displayable on the visual display units 31 and/or 32 are controlled by an electric control device (preferentially arranged inside the housing) preferentially in the form of a computer, which in the present case is incorporated inside the housing in its lower section. The mentioned control device controls thereby on the one hand the display unit 30 and communicates on the other hand with the control keys of the control panel 35, wherein also further functional components such as a winnings distribution unit, a money insertion unit and a money examination device can be controlled by the control device.

The server 1 is preferentially placed in a separately secured room 200, which is separated from the room 201, where the automatic gaming machines are, and which is as a rule not accessible to the player. The server 1 is connected with a printer 5 and the server 1 further includes a memory for the storing of a database 15, 17 of datasets 41 and release datasets, which is explained in more detail below.

If a game is executed by a player or a user on one of the automatic gaming machines 2 the respective player has to pay a stake or a fee for the execution of the game. This fee can be paid in different ways and manners, either the money can be inserted directly into the automatic gaming machine 2 or cashless types of payment such as the reading of confirmation tickets 3 or of chip cards can be carried out. In each event the player is authorised with the payment of a certain fee or a certain stake to execute a game. Automatic gaming machine 2 contains a game unit 20 in which the respective credit balance 102 of the player is stored. The credit 102 can vary according to the outcome of the game. If the player wins the game, then his credit 102 can be increased or free or bonus games can be granted. If the player loses the game or if the game is a fee-based game whose fee is raised irrespective of the outcome of the game, the credit balance 102 of the player diminishes.

In this context it is advantageous that the player can execute an almost unlimited number of games in succession without money transactions between the player and the automatic gaming machine needing to take place. It is therefore also possible to store particularly small amounts of money or non-round amounts of money in the automatic gaming machine and to pay out the remaining credit 102—if still existing—to the player only after the conclusion of a number of games.

Figure 6:
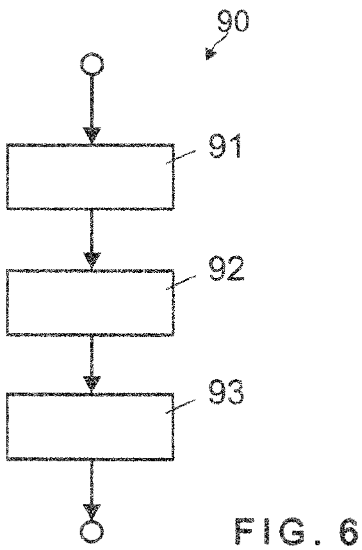
FIG. 6 shows schematically the process of the print-out in detail.
Figure 7:
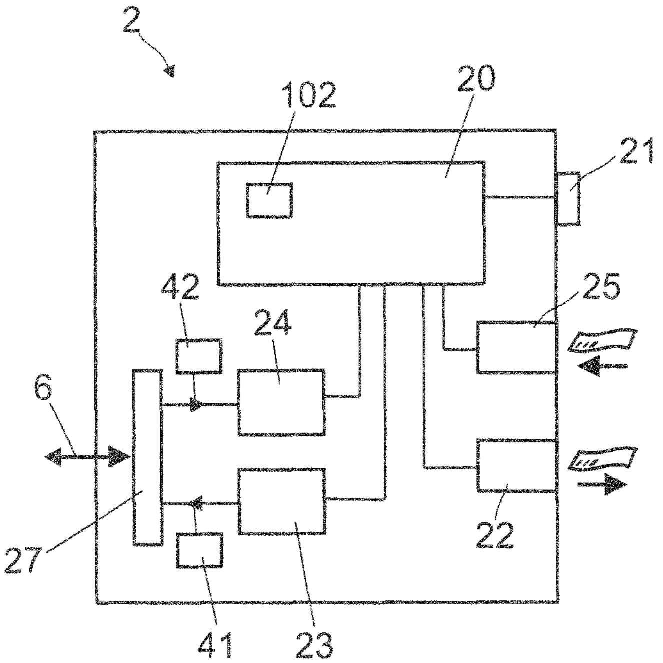
FIG. 7 shows schematically the structure of an automatic gaming machine.

In the following a detailed procedure of the pay-out of the credit 102 to the player, as illustrated in the FIGS. 3 to 6, set forth The credit 102 is, as illustrated in FIG. 7, stored in a memory of the game unit 20. By activating a pay-out unit 21, (FIG. 3, step 60) of either a real or virtual (via the touch screen) key or control button or lever the player makes it understood that he wants to end playing the game at the respective automatic gaming machine 2 and that he wants to have his remaining credit 102, for example, on a paper strip with a corresponding imprint showing the credit 102.

To this purpose the following steps are carried out:

The automatic gaming machine 2 creates a dataset 41, wherein the dataset 41 contains the credit 102 of the player as well as, if applicable, further information, for example the time of pay-out, an identification 101 of the automatic gaming machine 2, the amount of the winnings 103 and/or the loss on this automatic gaming machine. (FIG. 3, branch Y) This dataset 41 is transferred to a sender unit 23 situated in the automatic gaming machine 2 (FIG. 3, step 61), which transfers the dataset 41 via the network 6 to the server 1. The sender unit 23 dispenses the dataset 41 containing the credit 102 to the server 1.

In this advantageous embodiment of the invention it is foreseen that a dataset 41, transferred by the request for pay-out by the player to the server 1, is transferred in an encoded manner from the automatic gaming machine 2 to the server 1. In this event the automatic gaming machine 2 features a decoding unit (not illustrated in the figure), which is upstream of the machine-side sender unit 23.

Figures 8, 9:
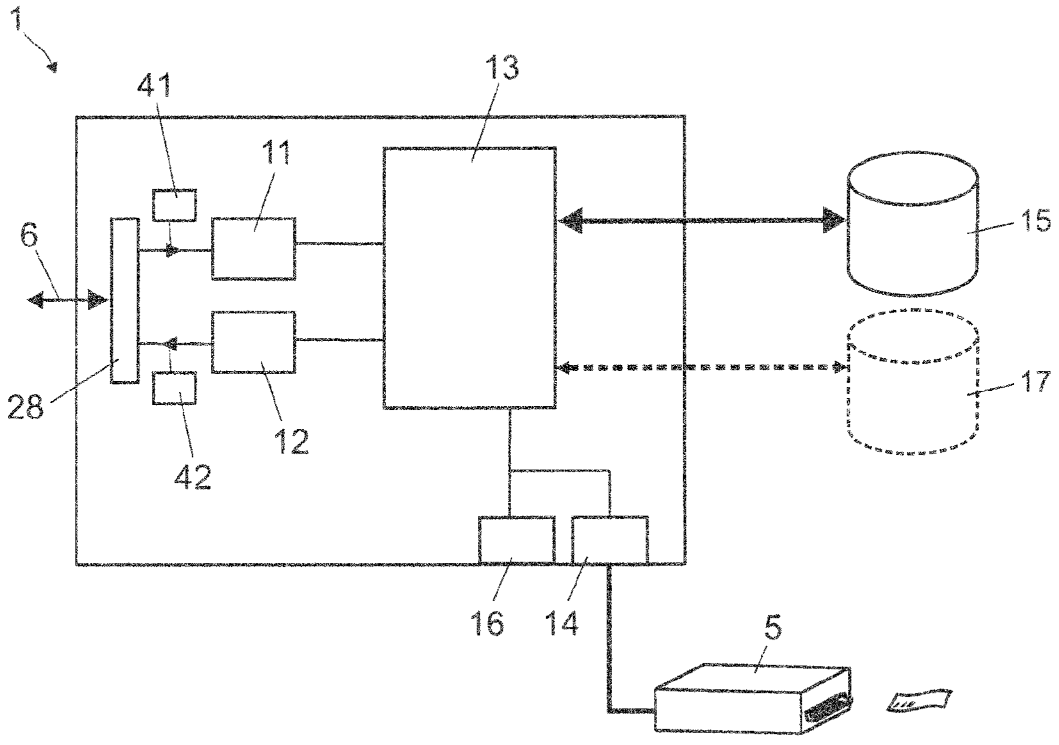
FIG. 8 shows schematically the structure of the server.
FIG. 9 shows schematically the structure of a database stored in the memory.

The dataset 41 is received by a receiver unit 11 on the server-side of the server 1 (compare FIG. 8). The server 1 features an examination unit 13 downstream of the server-side receiver unit 11, which initially assesses the dataset 41 in terms of regularity, completeness and authenticity.

The server 1 features in this event a decoding unit (in the figures not illustrated in greater detail), which decodes the dataset transferred from the automatic gaming machine 2. The encoding unit and the decoding unit have mutually corresponding codes, so that a decoded data transfer of the datasets 41 by the automatic gaming machine 2 to the server 1 is possible. An encoding is as a matter of course only optional, the system can also be operated without encoding.

Figure 4:
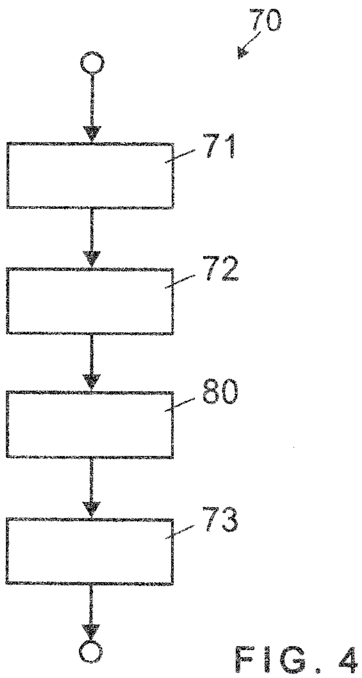
FIG. 4 shows a flow diagram for the central ticket printout.

For the imminent print-out on the printer 5 the received dataset 41 is converted by the examination unit 13 into a printable form, in the present particular embodiment a barcode 107 is created (FIG. 4, step 71).

The examination unit 13 initiates the storage (FIG. 4, step 72) of the dataset 41 in the database 15 and subsequently checks if the storage of the dataset 41 in the database 15 was successful.

In a further step the dataset 41 available in printable form is transferred to the printer memory 16 in the server 1 and is kept available therein for print-out and a print-out is initiated (FIG. 4, step 80).

As already mentioned, a printer 5 is connected with the server 1, wherein the server 1 contains a print control unit 14 which after the receipt of the dataset 41 in the print memory 16 initiates the print-out of the respective dataset by the printer 5. If a print-out exclusively on paper is to occur (FIG. 5, branch "N"), then the dataset 41 available in printable form in the printer memory 16 is printed (FIG. 5, step 83).

Figure 5:
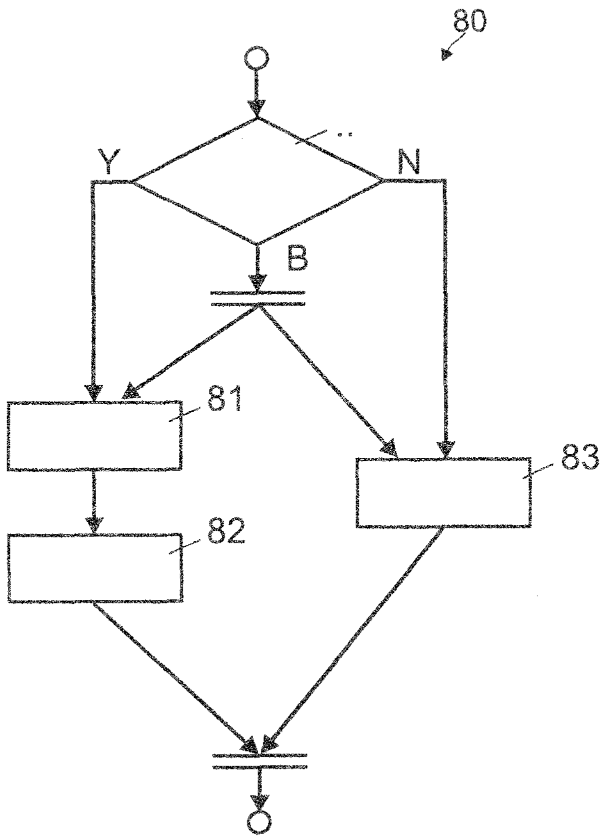
FIG. 5 shows a flow diagram for the print of the confirmation printout.

Alternatively an "electronic print-out" (FIG. 5, branch "Y") can be foreseen so that the dataset 41 available in printable form is included in an electronic print-out (FIG. 5, step 81) and is subsequently stored and kept available for a later print-out (FIG. 5, step 82).

The "electronic print-out" and the print-out via the printer 5 can also be performed simultaneously or consequently (FIG. 5, branch "B").

After examination of the storage of the dataset 41 and, if applicable, the exclusively simple electronic print-out the credit 102 of the player can be deleted on the automatic gaming machine 2 (FIG. 4, step 73). In some countries the deletion of the credit 102 of the player is still not permitted at this moment so that the deletion can only occur in a step 62 after the print-out of the confirmation ticket 3 (FIG. 3, step 62).

Figure 3:
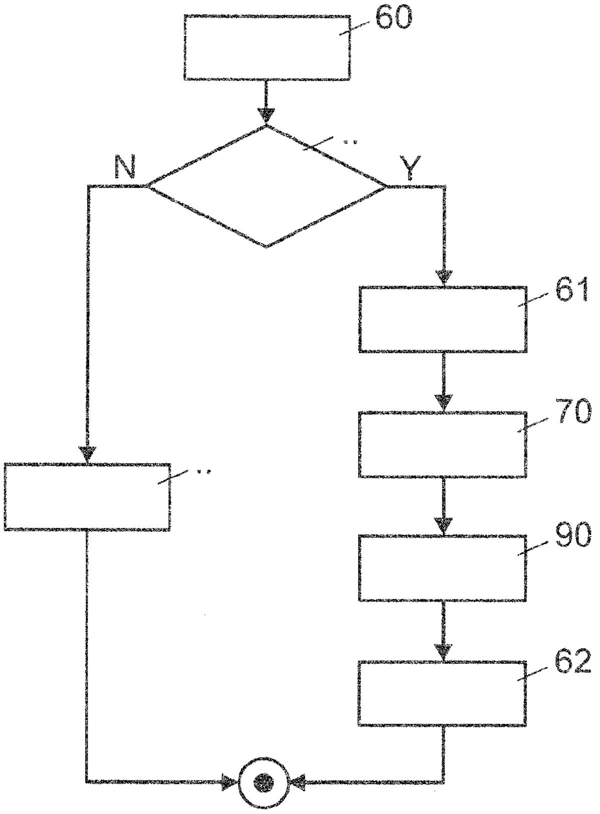
FIG. 3 shows a flow diagram with the sequential control of the pay-out.

If the storage of the dataset 41 in the database 15, 17 and, if applicable, the exclusively electronic print-out is confirmed, then the examination unit 13 generates a release dataset 42 which is transferred to a server-side sender unit 12 in the server 1 (FIG. 3, step 90). From the server-side sender unit 12 the release dataset 42 reaches via the network 6 the respective automatic gaming machine 2.

The release dataset 42 contains a confirmation code 111 as well as, if applicable, further information, such as the amount of the credit 102, an identification 101 of the respective automatic gaming machine 2 as well as additional information 112, which as may be the case is to be printed out on the confirmation ticket 3.

Additionally it can be foreseen that between the examination unit 13 and the server-side sender unit 12 a further (in the figures not illustrated in greater detail) encoding unit is arranged, which encodes the release dataset 42 and makes available the encoded value of its output to the server-side sender unit 12. Although such a decoding is only optional it has in particular the advantage that access by non-authorised persons to the data transfer between server 1 and the automatic gaming machine 2 is prevented as far as possible. If the encoding unit is in the server then also the automatic gaming machines 2 have a corresponding decoding unit downstream of the machine-side receiver unit (24) which facilitates the decoding of the release dataset 42 released by the server 1. If applicable, the server 1 can use a different code for the communication with each individual automatic gaming machine 2.

With detection of the release dataset 42 an output unit 22 in the automatic gaming machine 2 initiates the output of the confirmation ticket 3. The release dataset 42 is converted into a printable electronic document (FIG. 6, step 90).

If applicable, a confirmation can be sent to the server 1 which confirms the receipt of the release dataset 43. In this event the server 1 registers the confirmation in the respective release dataset (FIG. 6, step 92).

The confirmation ticket 3 is in the present case generated by the output unit 22 (FIG. 6, step 93). The output unit 22 contains a ticket printer for the release of the data stored in the release dataset 42 to the ticket carrier body, for example paper, or a chip card writing device for the storage of the release dataset 42 on a chip card.

The confirmation ticket 3 contains a code as well as, if applicable, the other information stored in the release dataset 42. In particular the amount of the credit is printed on the confirmation ticket 3 in a manner readable for humans. Advantageously the confirmation ticket 3 and the original ticket printed by the printer 5 have suitable identification information so that, if applicable, a simple comparison of both tickets is possible, for example in the event of a fault when reading the tickets into the automatic gaming machine 2. These measures facilitate therefore, if applicable, a simple and quick clarification of the matter.

At the latest after a print-out of the confirmation ticket the credit 102 can be deleted by the respective automatic gaming machine as the player had received a confirmation ticket 3 for taking the credit 102, which allows him the pay-out of the credit or the use of the credit for other automatic gaming machines 2 (FIG. 3, step 62). The credit stored in the automatic gaming machine will be deleted.

As illustrated in FIG. 9, the database 15 contains the datasets 41 received by the server 1. In the particular embodiment of the invention illustrated in FIG. 9 the respective dataset 41 as well as the release dataset allocated to the former 42 are stored as a common dataset in the database 15.

Alternatively an additional database 17 could be foreseen (as in FIG. 8 shown in dotted lines), wherein this additional database 17 contains the release dataset 42, wherein the datasets 41 received by the server 1 are stored in the database 15. Between the two databases 15, 17 an unambiguous allocation of one dataset 41 and one release dataset 42 respectively is created, for example via a common code or an allocation table, so that for each stored dataset 41 a stored release dataset 42 is reversibly clearly allocated.

The datasets 41 contain preferentially an identification 101 for the automatic gaming machine 2 via which the player initiates the respective pay-out of the credit 102, the credit 102, furthermore the time 104 and the date 105 of the actuation of the pay-out unit 21, if applicable, the winnings/loss 103 during the game on the automatic gaming machine 2 as well as, if applicable, the length of play on the respective automatic gaming machine 2. If need be, a clearly allocatable identification 106 of the player can be given, which is stored by the confirmation ticket 3 read in the automatic gaming machine 2 and which is printed again on the next confirmation ticket 3 after the pay-out so that any placed transactions are stored in a comprehensible manner.

The release datasets 42 contain, apart from the content of the dataset 41 additionally a release password or a release code 111, which facilitates a clear identification and addressing of the dataset 41 in the database 15 and thereby facilitates the access to the credit by a further automatic gaming machine 2.

In particular the confirmation ticket 3 serves as voucher or advertising media. The release dataset 42 may also contain further, possibly randomly selected, voucher information 112 which, if applicable, is also imprinted on the confirmation ticket 3.

The data to be printed on the confirmation ticket 3 are contained in the release dataset 42 or can be alternatively added by the automatic gaming machine 2. The release dataset 42 is transferred by server-side sender unit 12 to the automatic gaming machine 2, wherein the automatic gaming machine 2 features a machine-side receiver unit 24 for the receipt of the release dataset 42.

More generally the reading device 25 and the output unit 22 can be designed as a common unit which reads as well as prints the confirmation ticket 3.

Another not illustrated embodiment of the design uses reprintable confirmation tickets 3. Again a common unit is used which features the functionality of the reading device 25 and the output unit 22. In this regard reference is made to the U.S. Pat. No. 5,854,477, whose content is hereby included in this application. This common unit can be developed in the form of the ticket processing unit as illustrated in the FIG. 1 or FIG. 10 of the quoted patent specification U.S. Pat. No. 5,854,477. A confirmation ticket 3 inserted into the automatic gaming machine 2 for the purpose of the confirmation or the certification of the credit is deleted by the automatic gaming machine 2 and rewritten which leads to an additional economisation of the confirmation tickets 3 in circulation. A new confirmation ticket 3 is issued on the carrier of the respective confirmation ticket 3 which has already served for the confirmation of the credit necessary for the game. Each player has thus only one carrier which is deleted by each automatic gaming machine 2 after completion of the game and is newly imprinted.

Through the print-out of the datasets 41 on the printer 5 there is a recording of the player results which is difficult to manipulate, the confirmation tickets 3 can be overwritten or deleted without the recording of the game result getting lost.

Alternatively there is also the possibility to employ a not illustrated destruction unit downstream of the reading device 25 which destroys the imprinted confirmation ticket 3 after the end of the game. In a preferred embodiment of the invention the confirmation ticket 3 is shredded in a preferred embodiment of the invention in the manner of a document shredder into fine pieces of paper so that the imprint is no longer identifiable.

The individual pieces of paper are deposited in a collection container and are compressed therein. During or after the destruction of the confirmation ticket 3 a new confirmation ticket 3 is created by the output unit 22 onto which a new code is imprinted, which is determined by the respective dataset 41 or release dataset 42. In such an event the output unit 22 has a paper feed unit where unprinted paper is stored, in particularly in a coiled manner. The paper feed unit forwards the unprinted paper, that is in particular available in form of a fanfold paper roll, to the output unit 22 which imprints the confirmation ticket 3 and imparts it to the user or dispenses it.

As an alternative to the fanfold paper roll the paper feed unit can be designed for holding available and forwarding pre-defined denominated paper sheets (similar to bank notes), wherein the paper sheets (tickets) are preferentially connected with each other by defined separators and are folded into a stack accordion-like.

The paper can be coated with a UV light sensitive chemical substance so that information on the paper can be deleted with irradiation by means of ultraviolet light.

Alternatively the paper can be coated with thermally sensitive substances. Such thermal printing paper has, for example, in an inactive state colourless dyes, so-called Leuco dyes, and a developer. The developer facilitates the activation of the dyes. The application of heat melts and combines these materials, i.e. their molecules bond in a chemical reaction. Leuco dyes which have connected with the developer produce, for example, black, blue and other colours. By a renewed separation of the coloured Leuco dyes and developers the colours are "deleted" again, i.e. the thereby displayed information gets lost.

Colouration and discolouration occur due to the difference of the effects of the temperature on the materials. The materials melt at a higher temperature T1 (for example 160° C.) and subsequent quenching. If the paper is heated again, but at a lower temperature T2, discolouration occurs. The usage of a thermo print head facilitates a selective application of temperature for areas in which colour is desired in order to produce, for example, text. The usage of a heating roll on the entire sheet of paper makes it possible to delete the text entirely. The process of imprinting and deleting can be carried out multiple times and can be repeated.

Alternatively there is the possibility, as illustrated in JP 2000154345 A (TOSHIBA), to use a deletable printing ink which after printing can be deleted by the effects of heat.

The invention claimed is:

1. A method for efficiently operating a gaming operation, which comprises the steps of:

disposing at least one automatic gaming machine having one game unit and one pay-out unit operable by a player for a pay-out of a credit in a form of a confirmation ticket or on a storage medium in a gaming room;

disposing a sever in a separate secured room separate from the at least one automatic gaming machine disposed in the gaming room, the server being connected to the a least one automatic gaming machine;

allowing an execution of a game with a presence of the credit via the automatic game unit and a pressing of an operating button by a user of the automatic game unit for starting the game, the automatic game unit having at least one display for displaying results of the game just executed;

transferring a dataset to the server with the presence of the credit and operation of the pay-out unit, the dataset containing an amount of the credit;

storing the dataset, following receipt, in the server and in an event of a successful storage a release dataset is returned to the automatic gaming machine;

printing out at least part of the dataset in a period between receipt of the dataset by the server and a transmission of the release dataset to the automatic gaming machine with a printer connected to the server and disposed in the secured room;

making available a confirmation ticket upon receipt of the release dataset at the automatic gaming machine; and dispensing the confirmation ticket to the player, via the automatic gaming machine, and the dataset will be kept available for a print-out by the server.

2. The method according to claim 1, wherein for confirmation of the credit:

reading a reprintable confirmation ticket showing at least information about the credit before the execution of the game; and subsequently deleting at least the information about the credit on the reprintable confirmation ticket, and a new imprint corresponding to at least one of the dataset or the release dataset is imprinted on the reprintable confirmation ticket.

3. The method according to claim 1, which further comprises performing at least one of:

printing the dataset on a printer connected to the server; or including the dataset in an electronic document stored in the server, which is held available for print-out.

4. The method according to claim 1, which further comprises:

including the dataset in a period between receipt of the dataset by the server and the transmission of the release dataset to the automatic gaming machine at an end of an electronic document.

5. The method according to claim 1, which further comprises performing one of:

printing out at least part of the dataset on a printer in a form of a barcode; or including the dataset in an electronic document.

6. The method according to claim 1, which comprises performing at least one of:

printing the confirmation ticket via the automatic gaming machine; and storing the confirmation ticket on a storage medium in data connection with the automatic gaming machine and allocated to the automatic gaming machine.

7. The method according to claim 1, wherein:

reading a reprintable confirmation ticket prior to a start of the game for a confirmation of the credit;

at least one of deleting, depositing, and compressing the confirmation ticket in the automatic gaming machine after an end of the game; or creating a new confirmation ticket onto which a new imprint corresponding to at least one of the dataset or the release dataset respectively, is printed.

8. The method according to claim 1, which further comprises:

storing the dataset received by the server and the release dataset created following the receipt of the dataset in the server in a manner relatable to another; or adding further information selected from the group consisting of a respective identifying information of the automatic gaming machine transferring the dataset, a time of the credit and a date of the credit, on the dataset.

9. The method according to claim 1, which further comprises performing at least one of:

deleting the credit after storage of the dataset in the server;

deleting the credit after a printing-out of the dataset by the server;

deleting the credit after an output of the confirmation ticket by the automatic gaming machine; or preparing the automatic gaming machine for execution of a new game.

10. The method according to claim 6, which comprises performing at least one of:

printing the confirmation ticket in a form of a barcode; and providing a chip card as the storage medium and storing the confirmation ticket on the chip card.

11. A system for allowing an efficient operation of a gaming operation, the system comprising:

a server disposed in a secured room;

a number of automatic gaming machines connected to said server and operable by a player, at least one of said automatic gaming machines having a game unit and a pay-out unit for a confirmation of a credit in a form of confirmation tickets, said automatic gaming machines disposed in a gaming room separate from said secured room;

said game unit facilitating an execution of a game with a presence of the credit;

said automatic gaming machine having a machine-side sender unit for releasing a dataset containing the credit to said server in an event of operation of said pay-out unit by the player during a simultaneous presence of the credit;

said server having a server-side receiver unit for a receipt of the dataset and a database for storing the dataset;

said server having an examination unit downstream of said server-side receiver unit for examining a storage of the dataset;

said server having a server-side sender unit which in an event of a successful examination of storage of the dataset by said examination unit sending a release dataset to said automatic gaming machine;

a printer connected to said server, said server having a print control unit, which initiates a print-out of at least part of the dataset by said printer following receipt of the dataset;

said automatic gaming machine having a machine-side receiver unit for receipt of the release dataset and an output unit, wherein with a receipt of the release dataset in said automatic gaming machine via said output unit a confirmation ticket is available and dispensable to the player; and said server containing a print storage having the dataset available for printout.

12. The system according to claim 11, wherein said automatic gaming machine having a reading device for reading the confirmation tickets or chip cards, wherein said reading device and said output unit are integrated in a common device, and said common device configured for a deletion and a renewed rewriting or a removal of an imprint and a consequent renewed imprinting of the confirmation ticket.

13. The system according to claim 11, wherein said output unit has a ticket printer for printing-out the confirmation ticket on a ticket carrier body.

14. The system according to claim 11, wherein said automatic gaming machine has one reading device and said output unit, wherein said output unit has a ticket printer for printing-out the confirmation ticket onto a ticket carrier body, and wherein said reading device has a reading unit for reading of the dataset stored on the confirmation ticket and said reading unit has a destruction unit.

15. The system according to claim 11, wherein said database for storing the dataset is allocated to a credit, and the credit containing other information including an identification number of said automatic gaming machine, a time of winnings and a date of the winnings.

16. The system according to claim 11, further comprising:

an encoding unit upstream of one of said server-side sender unit or said machine-side sender unit, said encoding unit encoding the release dataset or the dataset in accordance with specified criteria and an established encoded value is made available to said server-side sender unit or said machine-side sender unit, wherein the encoded value is contained in the dataset or in the release dataset; and a decoding unit for decoding of the release dataset or the dataset is downstream of said machine-side or said server-side receiver unit.

17. The system according to claim 11, further comprising an additional database in which the release dataset is stored, wherein an allocation between the dataset and the release dataset following the receipt of the dataset is stored, or the dataset and the release dataset created following the receipt of the dataset are combined in one common dataset and stored in a common database.

18. The system according to claim 11, wherein said output unit has a chip card writing device for storing the confirmation ticket onto a chip card.

19. The system according to claim 14, wherein said destruction unit is a document shredder for destructing the confirmation tickets; and further comprising a collection container for collecting destroyed confirmation tickets.

20. A non-transitory computer readable medium having computer-executable instructions for performing a method of operating a gaming room having a number of automatic gaming machines, at least one automatic gaming machine having one game unit and one pay-out unit operable by a player for a pay-out of credit in a form of a confirmation ticket or a storage medium, which comprises the steps of:

allowing communications between the automatic gaming machines disposed in the gaming room and a server disposed in a secured room separate from the gaming room;

allowing an execution of a game with a presence of a credit via the game unit;

transferring a dataset to the server with the presence of the credit and operation of the pay-out unit, the dataset containing an amount of credit;

storing the dataset, following receipt, in the server and in an event of a successful storage a release dataset is returned to the automatic gaming machine;

printing out at least part of the dataset in a period between receipt of the dataset by the server and a transmission of the release dataset to the automatic gaming machine with a printer connected to the server;

making available a confirmation ticket upon receipt of the release dataset at the automatic gaming machine; and dispensing the confirmation ticket to the player, via the automatic gaming machine, and the dataset will be kept available for a print-out by the server.

* * * * *